United States Patent [19]

Lopez et al.

[11] Patent Number: 5,023,767
[45] Date of Patent: Jun. 11, 1991

[54] HIGHLY EFFICIENT CONVERSION CIRCUIT FOR POWER SUPPLIES

[75] Inventors: Javier E. M. Lopez, Mataro; Mark G. Palaske, Alella, both of Spain

[73] Assignee: Quest Electronics, SA, Barcelona, Spain

[21] Appl. No.: 506,575

[22] Filed: Apr. 9, 1990

Related U.S. Application Data

[63] Continuation of Ser. No. 244,903, Sep. 15, 1988, abandoned.

[30] Foreign Application Priority Data

Sep. 21, 1987 [ES] Spain .................................... 8702699

[51] Int. Cl.$^5$ ............................................ H02M 3/335
[52] U.S. Cl. ......................................... 363/17; 363/98; 363/132
[58] Field of Search ....................... 363/17, 41, 56, 97, 363/98, 132, 133, 134, 49

[56] References Cited

U.S. PATENT DOCUMENTS

| | | | |
|---|---|---|---|
| 3,465,231 | 9/1969 | Hyde | 363/17 |
| 3,579,078 | 5/1971 | Cronin | 363/17 |
| 4,298,926 | 11/1981 | Black | 363/17 |
| 4,399,499 | 8/1983 | Butcher et al. | 363/17 |

Primary Examiner—Peter S. Wong
Attorney, Agent, or Firm—Jensen & Puntigam

[57] ABSTRACT

The patent application refers to a conversion circuit with high efficiency for power supplies which in addition has the capability of changing alternating current to direct current and vice versa, adjusting the voltage supplied automatically for the load. These circuits can include schemes for isolating the inputs from the outputs of the circuits by switching capacitances, with less losses than conventional schemes and marked by their high efficiency with relation to the parasitic capacity at the input and the output. The entire circuit is controlled digitally, whether supplying a constant current or a constant voltage.

13 Claims, 6 Drawing Sheets

HIGHLY EFFICIENT CONVERSION CIRCUIT FOR POWER SUPPLIES

This is a continuation of application Ser. No. 244,903, filed on Sept. 15, 1988, now abandoned.

BACKGROUND OF THE INVENTION

The object of the present patent application is a Efficient Conversion Circuit for Power Supplies.

After a long and costly research and development effort, motivated by a significant industrial need, due to the lack of circuits such as the one described here in the world market, the aforementioned circuit has been invented, and demonstrates a number of fundamental advantages over present day circuits for the conversion of electrical energy existing now on the world market.

Those present day circuits are based on electronic configurations that do not permit them to achieve high conversion efficiency if not by a disproportionate increase in the size of the basic components.

This lack of efficiency is manifested in a loss of energy principally in the form of heat, being as well an essential cause of their low efficiency.

At the same time, and due to the configuration of said circuits, the output voltage and consequently the output current suffer a distortion of their normal waveform, characteristically in the form of ripple, undesirable and harmful for other circuits, both active and passive, to which the conversion circuit is connected.

The currently presented circuits are based on the direct conversion of supply circuits. Up until now, the conversion of energy is indirect and galvanic, i.e. from electrical to magnetic and again to electrical, by means of transformers. This transformation of energy galvanically puts a limit on the efficiency of their conversion that rarely surpasses 86%. Nevertheless, and due to the direct transformation of energy i.e. without the use of conventional transformers, that characterizes the present circuits, efficiencies above 90% can be achieved, nearing 97% power supply conversion efficiency in some cases.

The present patent application, as already mentioned constitutes a conversion circuit, i.e. a power supply, that can convert A.C. to D.C. and vice versa, being able to either increase or decrease the input voltage and automatically adjusting the output voltage to the requirements of the load connected.

As well, these circuits, producing a stabilized and regulated output, can be regulated either in voltage or current according to the application. This characteristic, with few modifications to the basic circuit, permits the application of this technology in high voltage, current regulated power supplies and in low voltage regulated power supplies.

The design of this present circuit is such that the regulated output of the circuit will remain regulated even with very wide variation of the input voltage. In current regulated configurations, the output voltage of the circuit is exactly that voltage required by the load to which it is connected. According to the multiplication that can be achieved, however the circuit will provide whatever voltage is required by the load up to this maximum. Therefore a power supply that generates an output voltage of 3000 volts can also be applied to loads that require 1000 volts, 500 volts, 100 volts, or even 1 volt without any modification whatsoever to the circuit. The circuit will continue to supply the preset or desired output current no matter what the output voltage is. To date, applicants know of no type of conventional power supply that can work in this way.

The present circuit is also designed to accept a great variation of its input voltage without this factor influencing the regulated value of the output, whether this be in voltage or in current.

The range of input voltages, according to the application of this circuit, can be very wide. For example, the described circuit can accept input voltages from 80 VAC to 280 VAC without this variation greatly influencing the regulation of the output voltage or current, maintaining this regulation very precisely, (less than 1% variation). This precision of regulation coupled with the wide range of input voltage is impossible with present day switch mode technology power supplies.

These circuits can incorporate switching isolation schemes, differentiating these from the galvanic isolation present in the great majority of power supplies. These switching isolation schemes have less losses than galvanic isolation, and the parasitic capacitance between input and output is superior in the majority of cases. The ohmic resistance may be similar, less or greater according to the application; however the most outstanding feature of this type of electrical isolation is its efficiency with relation to its parasitic capacitance between input and output.

The entire circuit is controlled, in terms of output voltage or current, digitally. This facilitates the control and variation of the functioning range of this type of power supply. It is equipped with an external connection so as to be able to control it externally by computer, if that is required.

Due to the numerous advantages that this circuit offers compared to other present day power supply circuits, its area of application is very wide.

It can be pointed out that this circuit offers advantages over current technology in the fields of power supplies for lasers, power supplies for computers, telecommunications, aeronautical and astronautical applications and electrical convertors of solar energy, only to name a few of the many applications that this type of power supply circuit has.

With this invention the functioning of many types of existing apparatus will be improved, and it will permit the realization of other applications previously unfeasible.

For a more detailed description of the invention, please refer to the accompanying schematics, which for sake of example and explanation, but without implyiny any limitations with reference to applications using the basic circuit, are represented here.

BEST MODE FOR CARRYING OUT THE INVENTION

Figure 1:
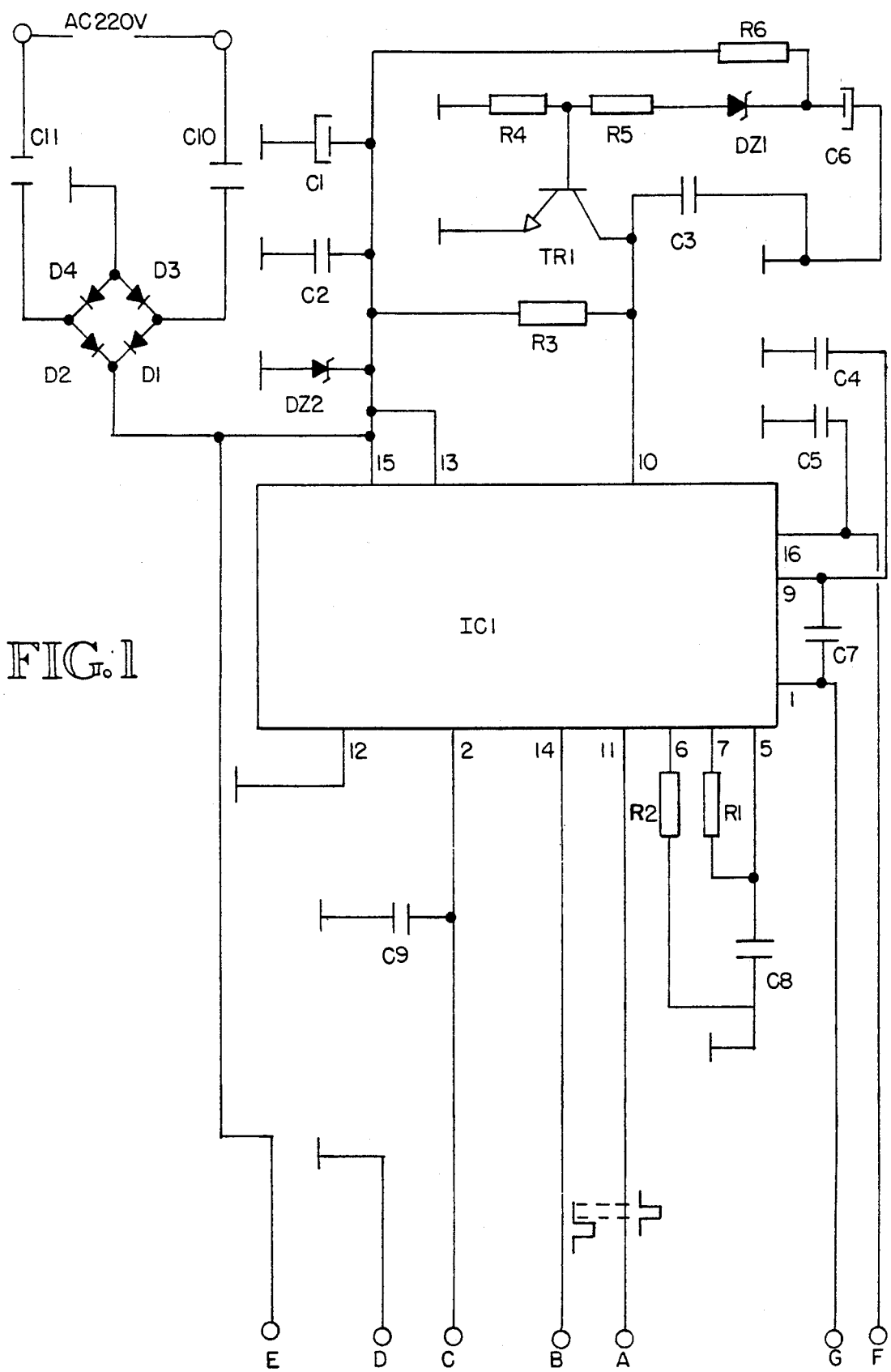
FIG. 1 is a schematic diagram of a circuit control portion of the power supply of the present invention.
Figure 2:
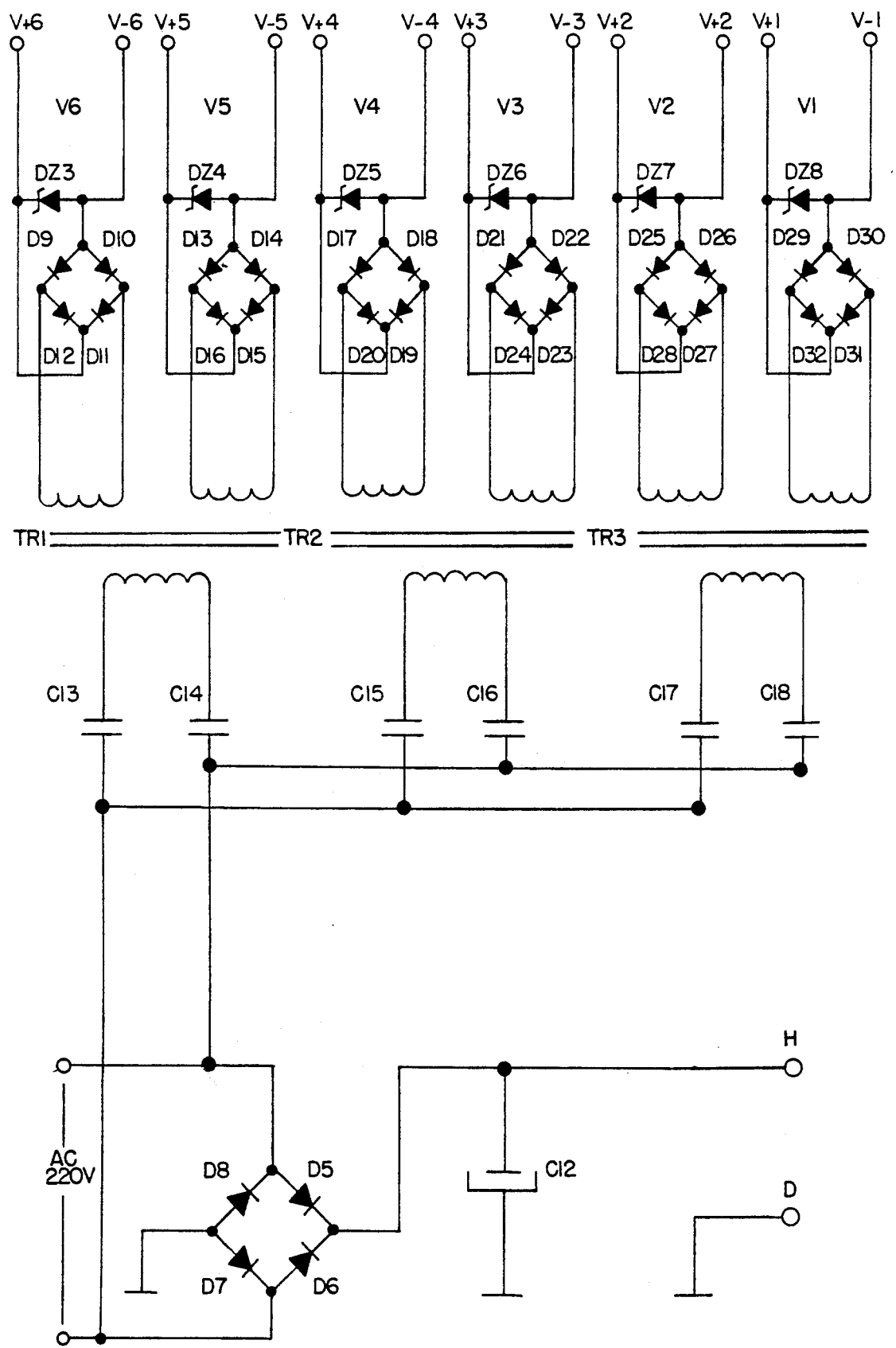
FIG. 2 is a schematic diagram of a circuit supply portion of the power supply of the present invention.
Figure 3:
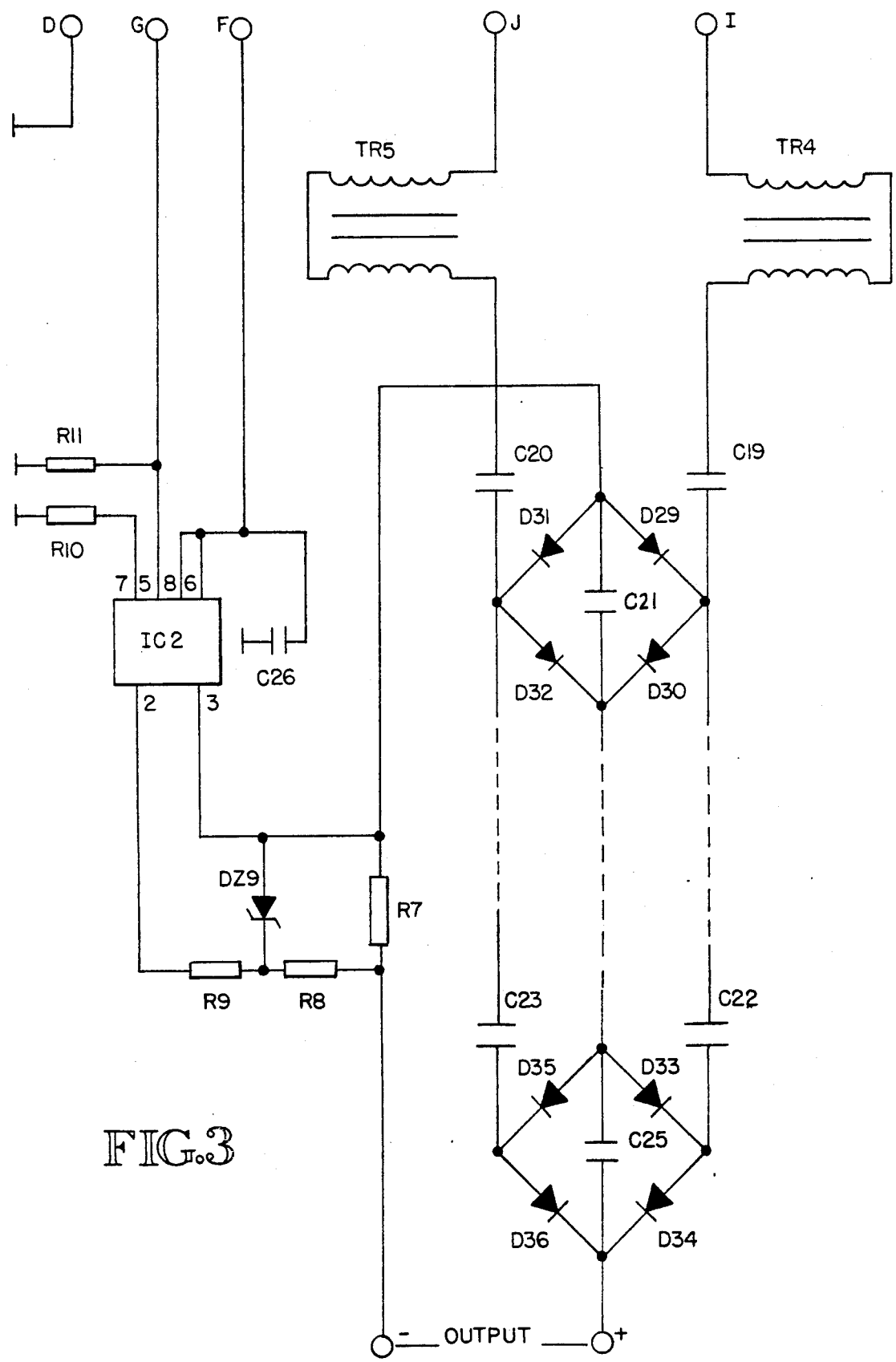
FIG. 3 is a schematic diagram of the output portion of the power supply of the present invention.

The circuit shown in Figure number 1 is for the control of the switching timing. This is supplied through output points labeled "A" and "B", these being components with equal magnitude in terms of switching time and frequency, but negated digitally between themselves.

The duty cycle of the switching time is ruled by the input points labeled "G" and "C" with their voltage levels being compared by the integrated circuit denominated IC1. The components marked with the following references: R-6, R-3, R-5, R4, C6, C3, D21, TR1 are a delay system to regulate the start up and shut down sequence.

The components marked R1-C8 fix the switching frequency of IC1.

The output point "E" corresponds to a 12 volt positive D.C. supply, with the general ground in all the schematics being the point marked in Figure number 1 as "D".

DESCRIPTION OF COMPONENTS IN FIGURE NUMBER 1

IC1-UC 3525
TR1-NPN transistors
DZ1-DZ2- zener diodes
C1-C6- electrolytic capacitors
C2-C3-C4-C5-C7-C8-C9-C10-C11- capacitors
R1-R2 R3-R4-R5-R6- resistors
D1-D2-D3-D4- diodes The circuit shown in Figure number 2 is the supply for the circuit shown in Figure number 5. This circuit includes a scheme for electronic isolation, which if desired, could be substituted by the circuit shown in Figure number 4 which is similar but does not include isolation between input and output. In the case of using the circuit in Figure number 4, the supplies V3, V4, V5 and V6 are not used.

DESCRIPTION OF COMPONENTS IN FIGURE 2

D5 to D32- DIODES
TR1-TR2-TR3- 50-60 HzAC TRANSFORMERS
C12- ELECTROLYTIC CAPACITOR
DZ3 TO DZ8- ZENER DIODES
C13 TO C18- CAPACITORS

The circuit shown in Figure number 3 is the general output of the groups of circuits or subassemblies. The components marked C19,C20, and D29,D30,D31,D32, are the components that comprise the basic cell for multiplying the input voltage, permitting the addition of however many cells are necessary to produce the desired voltage. The capacity of the capacitors of the basic cell will change depending on the current required by the load.

The characteristics of the diodes in the basic cell will vary as well according to the current and voltage required for each application.

The components marked TR4 and TR5 in Figure number 3 are two transformers with ferrous cores. The characteristics of these components will vary according to the current and voltage supplied by the voltage multiplication cells. The optocouples marked in Figure No. 3 and the IC marked IC2 as well as the components R7,R8,R9,R10,R11,C26,D29 convert the current that circulates through R7 to a voltage at the point marked "G", this being proportional to the current through R7.

The points marked F-G-D in Figure number 3 are connected to their corresponding letters in Figure number 1.

DESCRIPTION OF COMPONENTS IN FIGURE 3

IC2- OPTOCOUPLER 6N139 or SIMILAR
TR4-TR5- FERRITE CORE TRANSFORMERS
R7 to R11- RESISTORS
DZ9- ZENER DIODE
D29 to D36- DIODES
C19 to C26- CAPACITORS

The circuit shown in Figure number 4 illustrates the power amplifier for the entire circuit, controlled by the signal at points marked A and B that come from the control circuit shown in Figure number 1.

The integrated circuits marked IC5, IC6, IC7, IC8 are signal amplifiers used to activate the gates of the MOSFET transistors.

The outputs marked I and J are connected to the inputs I and J respectively in Figure number 3. The point marked H is the positive supply coming from the same point H in Figure number 2.

DESCRIPTION OF COMPONENTS IN FIGURE 4

M1-M2-M3-M4- POWER MOSFET TRANSISTORS
IC3-IC4- OPTOCOUPKERS 6N139 OR SIMILAR
IC7-IC8- INVERTED AMPLIFIERS FOR MOSFETS
IC5-IC6- NON INVERTED AMPLIFIERS FOR MOSFETS
R12 TO R17- RESISTORS
C31-C32-C35-C36- ELECTROLYTIC CAPACITORS
C27-C28-C29-C30-C33-C34- CAPACITORS
D36 TO D43 DIODES

The circuit shown in Figure number 5 shows, as does Figure number 4, the power amplifier for the entire circuit. The difference between the two circuits is that the circuit shown in Figure number 5 incorporates a scheme to isolate the input from the output by electronic switching, this being the fundamental mission of this circuit.

Figure 4:
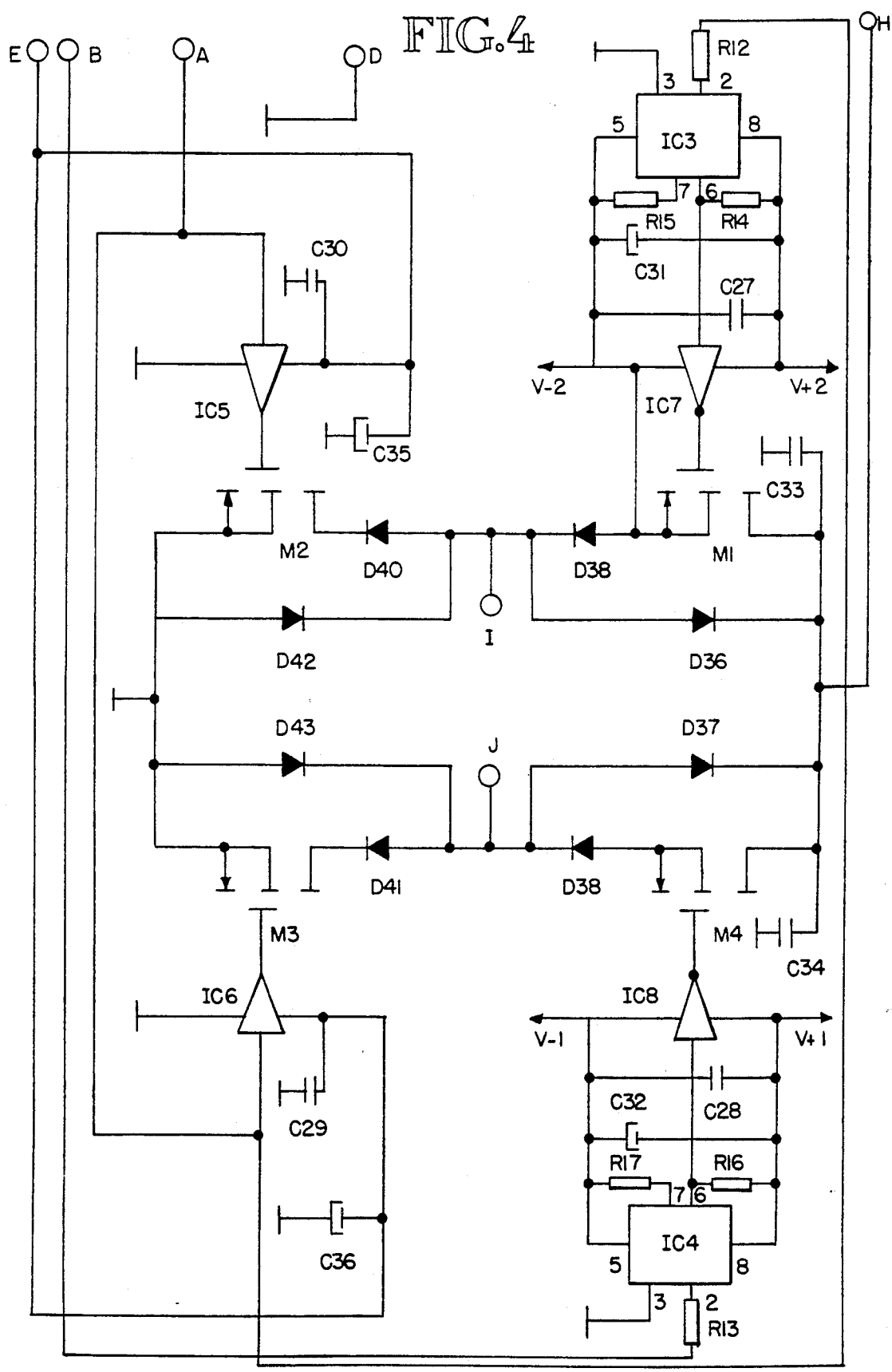
FIG. 4 is a schematic diagram of the power amplifier portion of the power supply of the present invention.
Figure 5:
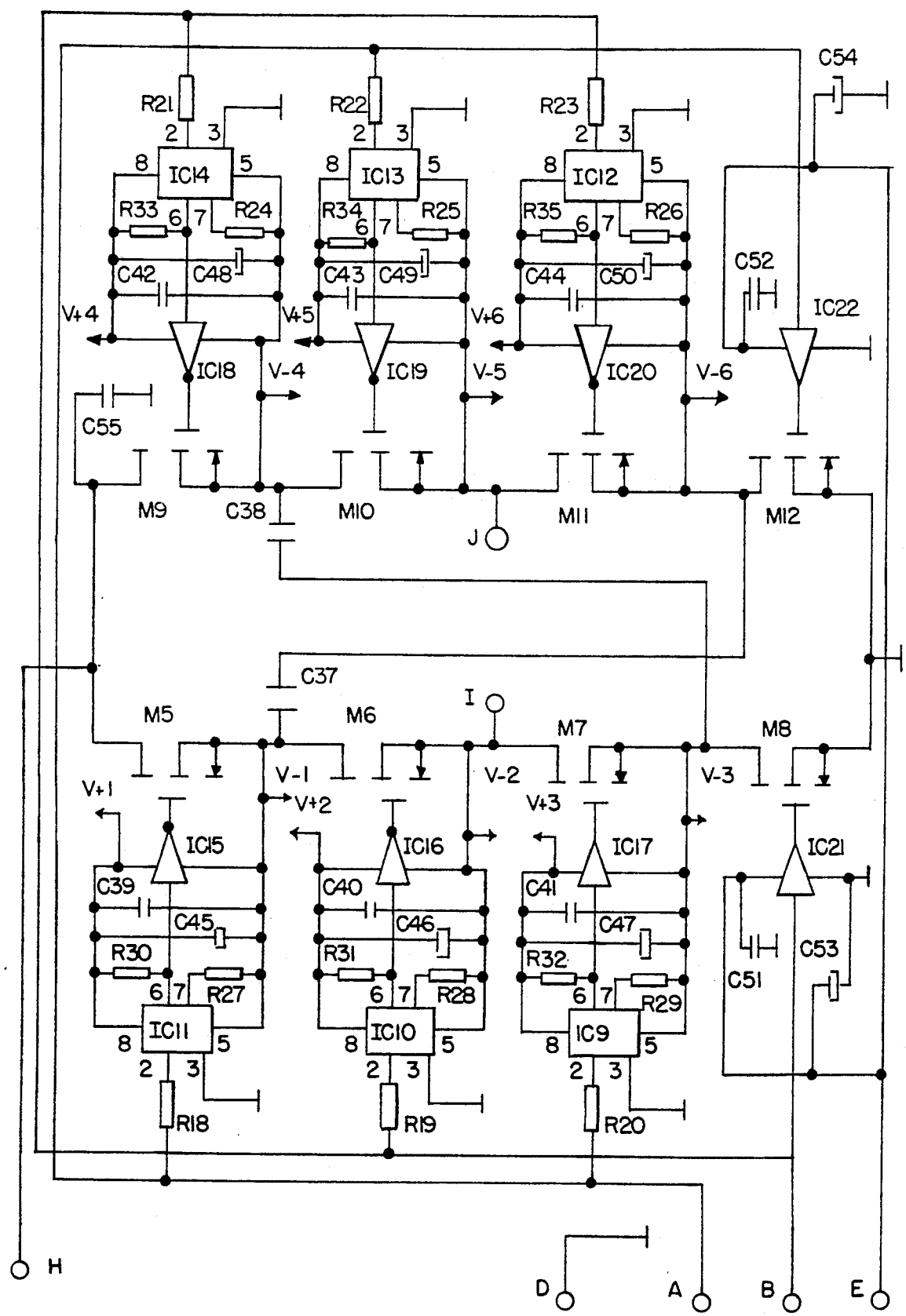
FIG. 5 is a schematic diagram of another power amplifier for the power supply of the present invention.

If isolation between the input and the output is not necessary then the circuit shown in Figure 4 is sufficient.

The integrated circuits marked in the schematic as IC15-IC16-IC21-IC18-IC19-IC20-IC22 are signal amplifiers used to activate the gates of the MOSFET transistors.

The outputs marked "I" and "J" are connected to the inputs marked "I" and "J" in the circuit of Figure number 3. The point marked "H" is a positive supply that comes from the same point on Figure number 3.

DESCRIPTION OF COMPONENTS IN FIGURE 5

M5 TO M12- MOSFET POWER TRANSISTORS
IC9 TO IC14- OPTOCOUPLERS 6N139 OR, SIMILAR
IC15 TO IC20- INVERTED AMPLIFIERS FOR MOSFETS
IC21 AND IC22 NON-INVERTED AMPLIFIERS FOR MOSFETS
R18 TO R35- RESISTORS
C45-C46-C47-C48-C49-C50-C53-C54-ELECTROLYTICCAPACITORS
C37-C38-C39-C40-C41-C42-C43-C44-C51-C55- CAPACITORS

Figure 6:
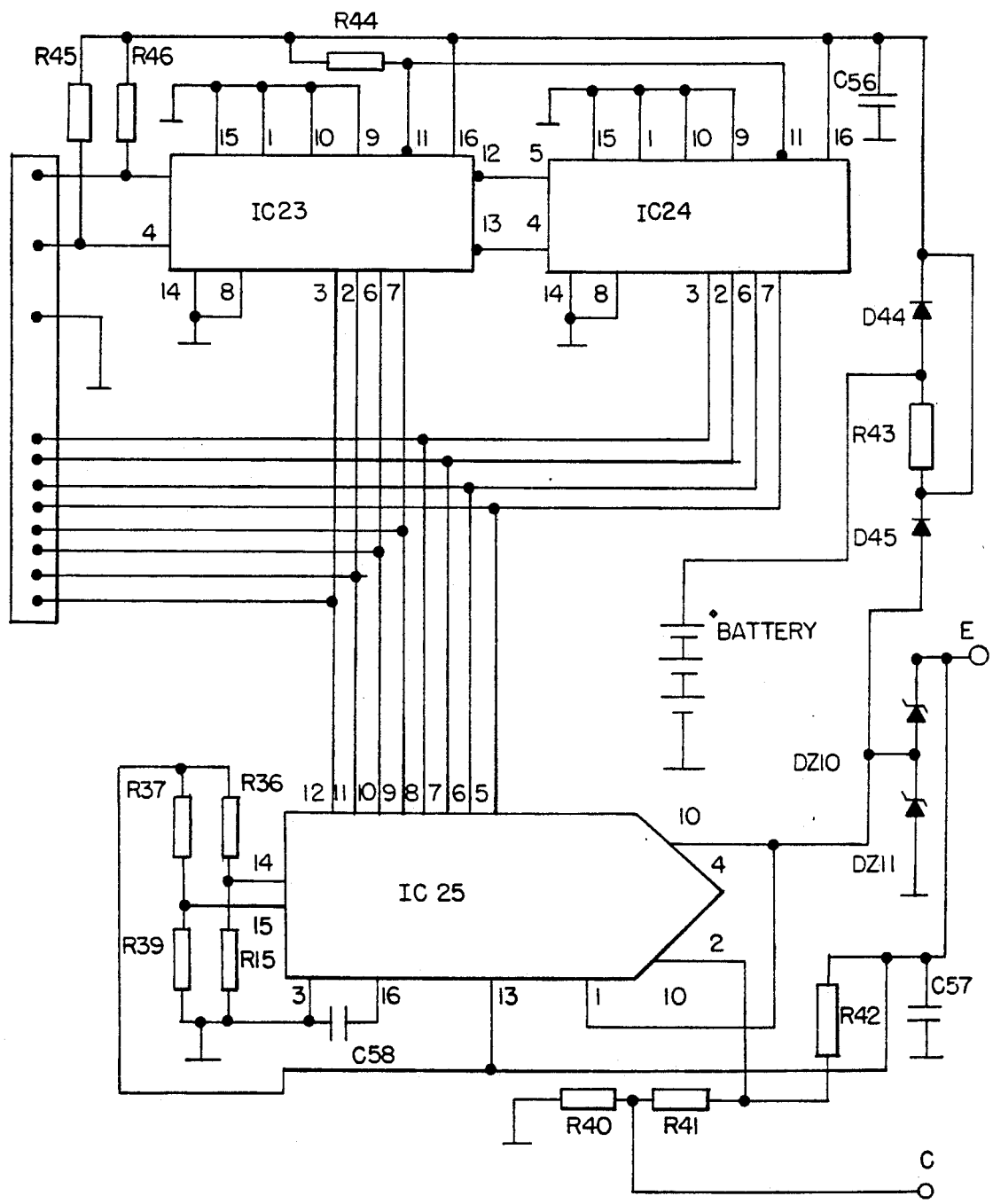
FIG. 6 is a schematic diagram of a voltage control circuit used in the power supply of the present invention.

The circuit shown in Figure number 6 shows a circuit to control the voltage level at the point marked "C". This control is done digitally and is compared by the circuit in Figure number 1. The point marked "C" in Figure 6 is connected to the same point in schematic number "1" the same being true for points "D" and "E" being connected to their respective points in Figure number 1.

The IC marked IC25 does the function of digital to analog conversion. In the same way, the IC's marked IC23-IC24 are 2 digital counters. The information in these counters is retained in memory due to the fact that their power source is maintained constant through a battery.

These digital counters are controlled through a connector by an external signal.

DESCRIPTION OF COMPONENTS IN FIGURE NUMBER 6

IC25- DIGITAL TO ANALOG CONVERTER, 8 BIT
IC23-IC24- DIGITAL COUNTERS, 4 BIT
R36 to R46- RESISTORS
C56-C57-C58 CAPACITORS
DZ10-DZ11 ZENER DIODES

What is claimed is:

1. A highly efficient power supply apparatus, comprising:
    means for receiving a power supply input signal;
    a timing circuit means for developing circuit control signals;
    a signal control circuit including at least one power amplifier, each power amplifier having a duty cycle and being responsive to the power supply input signal and having associated therewith a signal amplifier responsive to said circuit control signals for activating said power amplifier at specified times, to produce a control circuit voltage signal, wherein the power amplifier comprises a plurality of power transistors and wherein the signal control circuit includes storage capacitors associated with the power transistors, the power amplifier further including means for sequentially activating and deactivating selected ones of the power transistors, thereby charging and discharging the storage capacitors in alternating fashion, the storage capacitors being connected in such a manner that a capacitor which is discharging to a load is not connected to the input signal receiving means, thereby achieving electrical isolation between the input signal and the load without a transformer;
    a voltage multiplier means for increasing the control circuit voltage signal to produce a power supply output voltage; and
    means feeding back a signal representative of the power supply output voltage to the timing circuit means for control of the circuit control signals, and hence control of the duty cycle of the power amplifier.

2. An apparatus of claim 1, wherein said signal control circuit includes a plurality of power amplifiers, each having an associated signal amplifier.

3. An apparatus of claim 1, wherein the voltage multiplier means includes two input lines for receiving the ouput voltage signal from the signal control circuit, two coils connected, respectively, in series with the two input lines, and at least one voltage multiplier cell, each voltage multiplier cell comprising two capacitors connecting the two coils, respectively, to a first pair of opposing sides of a diode bridge, and wherein the power supply output voltage is obtained from a second opposing pair of opposing sides of the diode bridge.

4. An apparatus of claim 3, including a plurality of voltage multiplier cells, connected in series.

5. An apparatus of claim 1, wherein the power transistors are MOSFET power transistors.

6. An apparatus of claim 1, including means for automatically adjusting the output of the voltage multiplier means in accordance with the load.

7. An apparatus of claim 1, wherein the apparatus is capable of accepting an input voltage within a range of five volts to three hundred and eighty volts, both AC and DC.

8. An apparatus of claim 1, including means for automatically regulating the output of the apparatus such that the output does not substantially vary over said range of input voltage.

9. An apparatus of claim 1, wherein the apparatus has a conversion efficiency at least as great as 95 percent.

10. An apparatus of claim 1, including means for digitally controlling the signal control circuit.

11. An apparatus of claim 10, wherein the digital control signal is from an external source.

12. An apparatus of claim 1, wherein the power supply is adapted to selectively increase or decrease the input voltage.

13. An apparatus of claim 1, including means for regulating the output of the apparatus by an optically coupled feedback signal selectively increases or decreases the power supply output voltage.

* * * * *